Nov. 16, 1937.   H. PAXTON   2,099,223
SIZER
Filed Jan. 18, 1935   2 Sheets-Sheet 1

INVENTOR
HALE PAXTON
BY
ATTORNEY

Nov. 16, 1937.  H. PAXTON  2,099,223
SIZER
Filed Jan. 18, 1935  2 Sheets-Sheet 2
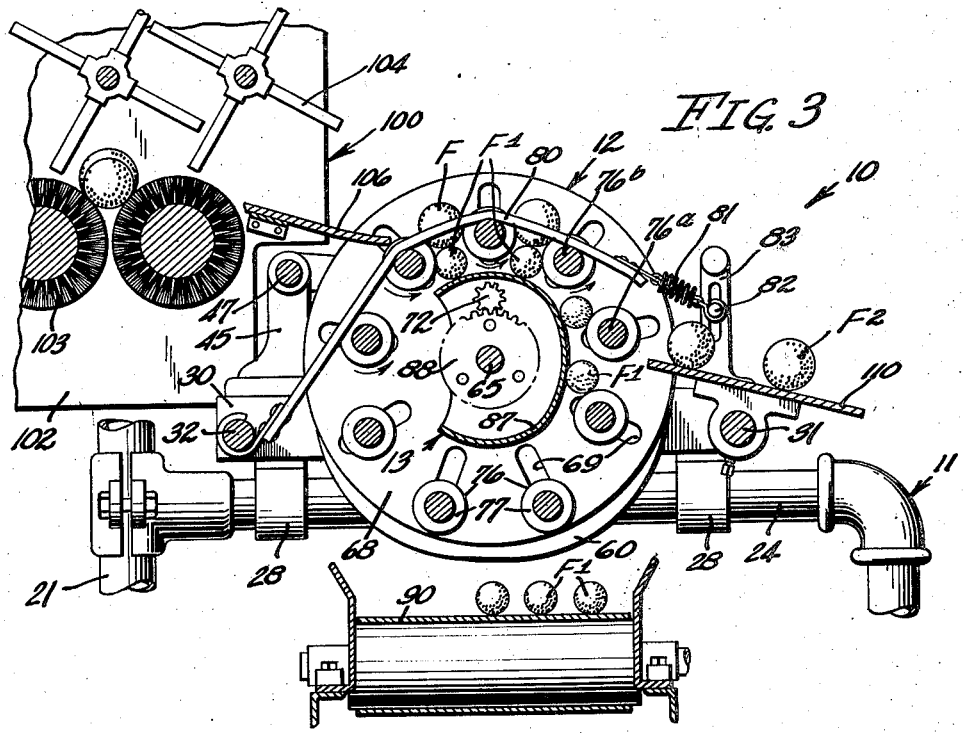
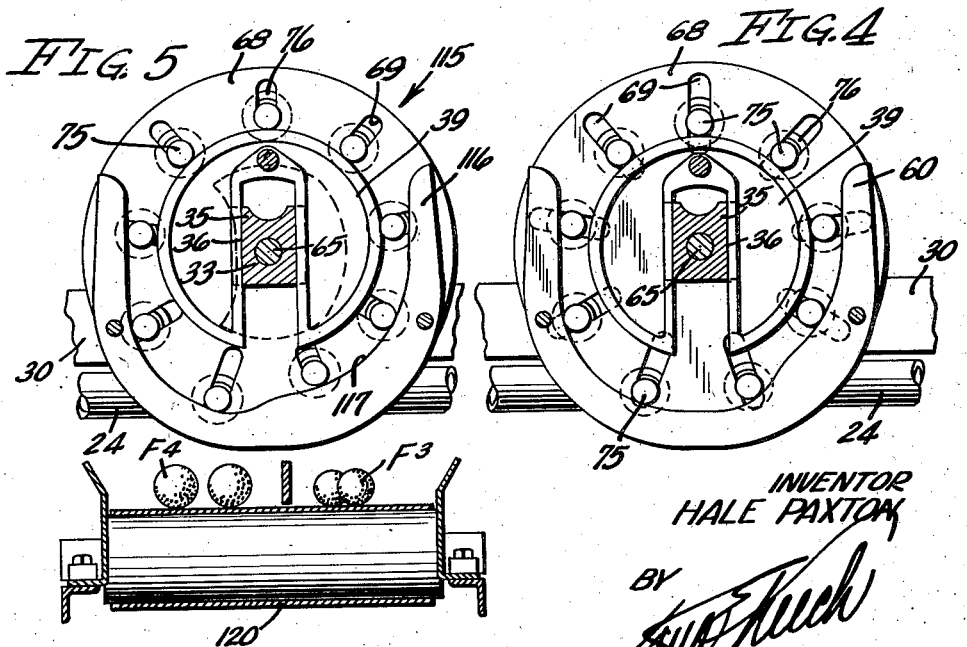
INVENTOR
HALE PAXTON
BY
ATTORNEY Patented Nov. 16, 1937

2,099,223

UNITED STATES PATENT OFFICE 2,099,223

SIZER

Hale Paxton, Santa Ana, Calif., assignor, by mesne assignments, to Food Machinery Corporation, a corporation of Delaware Application January 18, 1935, Serial No. 2,367

17 Claims. (Cl. 209—106)

This invention has to do with the art of separating rollable articles in accordance with their size and has particular utility in the sizing of fresh fruit such as oranges, lemons, and apples.

This invention aims, among other things, at satisfying the following commercial needs: first, the need for a relatively inexpensive, efficient and long lived sizing apparatus; second, the need for a sizing apparatus which is relatively short in length though broad; third, the need for a sizing apparatus having a large capacity relative to its size; fourth, the need for a sizing apparatus having a high degree of accuracy; fifth, the need for a sizing apparatus which may be relatively easily adjusted to change the sizes into which articles are segregated there; and sixth, the need for a sizing apparatus which handles fresh fruit gently.

These as well as numerous other objects and advantages are realized in the invention as will be seen by reference to the following description taken in connection with the accompanying drawings in which:

Fig. 3 is a vertical sectional view taken on the line 3—3 of Fig. 2.

Fig. 4 is a vertical sectional view taken on the line 4—4 of Fig. 2.

Fig. 5 is a view similar to Fig. 4 showing a modified form of my invention.

Figure 1:
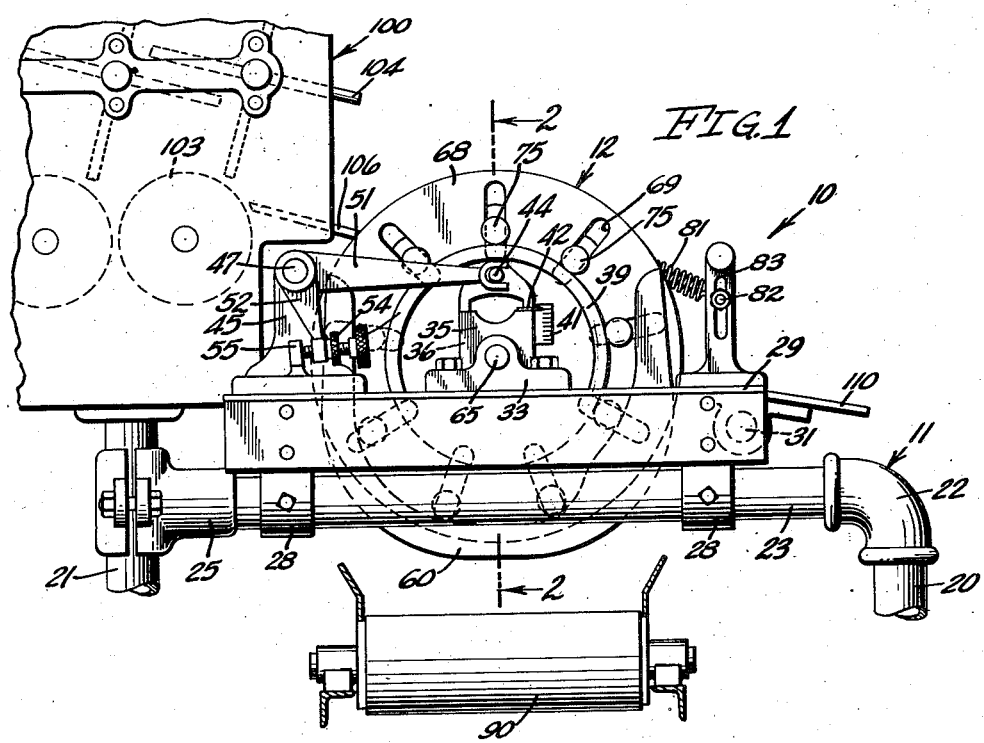
Fig. 1 is an end view of a preferred embodiment of my invention.

Referring specifically to the drawings a sizer 10, comprising a preferred embodiment of my invention is shown in Fig. 1. The sizer 10 includes a frame 11, a rotor 12 and a mandrel 13.

Figure 2:
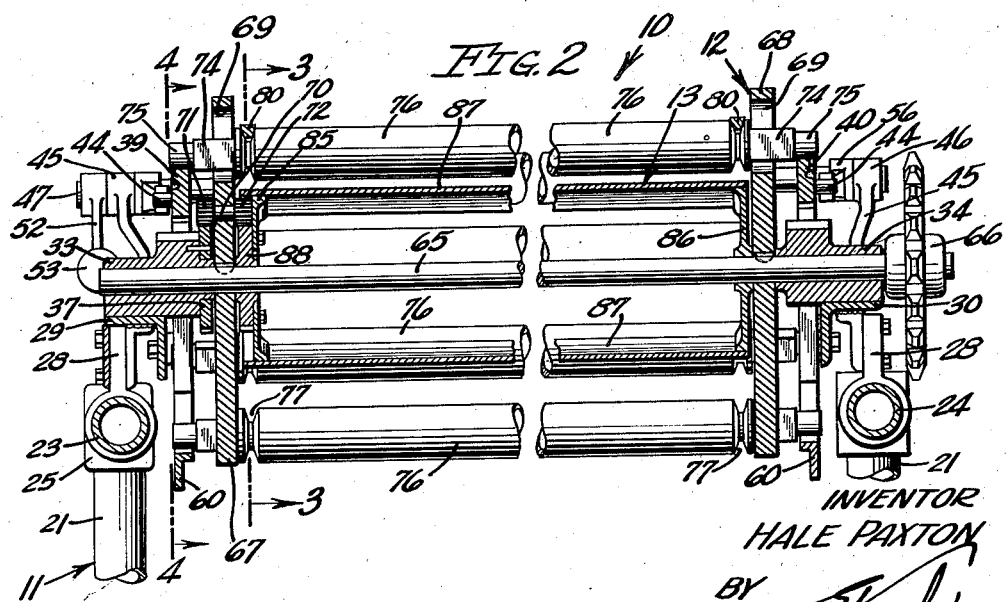
Fig. 2 is a vertical sectional view taken on the line 2—2 of Fig. 1.

The frame 11 includes a pair of vertical pipes 20 at the right side of the sizer 10 as viewed in Fig. 1 and a second pair of pipes 21 at the left side thereof. The posts 20 and 21 extend upward from a floor (not shown). Screwed onto the upper ends of the pipes 20 are L's 22 into which the ends of horizontal pipes 23 and 24 are screwed, the opposite ends thereof being secured to the pipes 21 by means of clamp fittings 25. Fixed on each of the pipes 23 and 24 is a pair of upstanding brackets 28 the latter supporting horizontal angle bars 29 and 30. Secured at their opposite ends to the angle bars 29 and 30 are right and left transverse tie rods 31 and 32 as seen in Fig. 3. Fixed centrally on the upper sides of the angle bars 29 and 30 are aligned bearings 33 and 34 as seen in Fig. 2. Each of the bearings 33 and 34 has a flange 35 formed integral therewith the latter being formed to provide vertically disposed slideways 36. Secured to the bearing 33, as shown in Fig. 2 is a gear wheel 37 the function of which will be made clear hereinafter.

Slidable vertically in the slideways 36 of the bearings 33 and 34 are circular cams 39 and 40. Provided on the cam 39 are graduations 41, the latter being adjacent a finger 42 mounted on the flange 35 of bearing 33 as shown in Fig. 1. Provided on each of the cams 39 and 40 are pins 44. Mounted on the angle bars 29 and 30 are bearings 45 and 46 in which a transverse shaft 47 is journaled. Keyed to one end of the shaft 47 on opposite sides of the bearing 45 are arms 51 and 52, the former being bifurcated to receive the pin 44 of cam 39 while the latter is tapped at its extremity to receive a threaded adjusting screw 53 the latter having a lock nut 54 thereon. As shown in Fig. 1 the bearing 45 has a lug 55 disposed in abutment with one end of the screw 53. Keyed to the end of the shaft opposite the bell crank 50 is an arm 56 bifurcated at its extremity to receive the pin 44 of the cam 40. It will be noted that adjustment of the screw 53 causes the shaft 47 to rotate thus swinging the arms 51 and 56 and thereby causing equal vertical movement of the cams 39 and 40.

Mounted on the angle bars 29 and 30 are U shaped cams 60 shaped as shown in Fig. 4, these cams being positioned in vertical alignment with the circular cams 39 and 40.

The rotor 12 includes a shaft 65 rotatably mounted in the bearings 33 and 34, a sprocket 66 being fixed on one end of the shaft 65 for driving the latter. Keyed on the shaft 65 adjacent the bearings 33 and 34 are discs 67 and 68, the latter being formed to provide radial slots 69. Rotatably mounted in the disc 67 is a short shaft 70 having pinions 71 and 72 fixed on its opposite ends. The pinion 71 meshes with the gear 37 which is fixed on the bearing 33. Carried by the discs 67 and 68 is a plurality of shafts 74, opposite ends of each of these being squared and received by aligned slots 69 of the discs 67 and 68. Rotatably mounted on opposite ends of each of the shafts 74 are rollers 75 positioned in radial alignment with the cams 39, 60, 40, and 61. Rotatable on the shafts 74 between the discs 67 and 68 are sizing rollers 76 opposite ends of each of these having annular V grooves 77. Connected to each end of the tie rod 32 of the frame 11 is a V belt 80 this being received by the grooves 77 of the uppermost rollers 76 as shown in Fig. 3. The belts 80 are yieldably held in position by springs 81 which are connected to bolts 82, the latter being adjustably received by suitable brackets 83 mounted on the angle bars 29 and 30.

The mandrel 13 includes a pair of heads 85 and 86 rotatably mounted on the shaft 65 just inside the discs 67 and 68. Fixed on the peripheries of the heads 85 and 86 and extending therebetween is a sheet metal wall 87 having a cross sectional shape as shown in Fig. 2. Bolted to the head 85 is a gear 88 of the same size as the aforementioned gear 37, as seen in Fig. 2 the gear 88 being positioned in meshing relation with the pinion 72 of the shaft 70. It is thus clear that the mandrel 13 is at all times locked against rotation relative to the frame 11 by the meshing of the pinions 71 and 72 with the gears 37 and 88.

Suitably mounted below the sizer 10, as diagrammatically shown in Fig. 1, is a belt conveyor 90.

Operation

In the preparation of citrus fruits for shipping, the fruit is washed, dried, polished and accurately separated according to size prior to the packing thereof. It is common practice to separate the extremely small fruit from the large after all the fruit is washed and before it is polished, etc. For this purpose a primary or "pony" sizer is employed.

The sizer 10 of my invention is shown in the accompanying drawings in conjunction with a fruit washer 100. The washer 100, shown fragmentarily in Figs. 1 and 3 includes a frame 102 in which a plurality of power driven cylindrical brushes 103 are mounted. Also mounted in the frame 102 above the brushes 103 are power driven cleanout members 104, the latter rotating at uniform R. P. M. to feed the fruit along on top of the brushes 103, each row of fruit being delivered separately from the washer by the endmost cleanout member 104. Mounted on the discharge end of the washer 100 is a sheet 106 of yieldable material such as rubber over which the fruit may roll from the washer 100 to the sizer 10.

When the shaft 65 of the sizer 10 is driven the discs 67 and 68 rotate carrying the sizing rollers 76 therewith. As shown in Fig. 4 the cam rollers 75 on the uppermost shafts 74 ride on the cams 39 and 40 while the cam rollers 75 of the lowermost shafts ride on the cams 60. It is clear that the spacing between the uppermost sizing rollers 76 is determined by the vertical positions of the cams 39 and 40. As shown in Fig. 3 fruit F is fed a single row at a time from the washer 100 onto the sizing rollers 76. Each piece of fruit F1 having a diameter less than the space between the rollers 76 falls downward between these and is trapped between two of the rollers 76 and the mandrel 13, the larger pieces of fruit F2 being carried by the rollers 76 and discharged onto a suitable drop board 110 provided on sizer 10. As the sizing rollers 76 are carried from the top side of the sizer to the bottom thereof the shafts 74 slide in the slots 69 so that the cam rollers 75 thereof ride on the cams 60 rather than the cams 39. As the shafts slide outward the space between the rollers 76 is increased allowing the trapped pieces of fruit F1 to drop from the sizer 10 onto the conveyor 90.

It will be noted in Fig. 3 that the V belt 80 causes the uppermost sizing rollers 76 to be rotated in the direction of the arrows. Rotation of the rollers 76 in this manner causes each piece of fruit to be rotated so that an irregular or egg-shaped piece of fruit whose shortest diameter is less than the spacing between the uppermost rollers 76 will be rotated until it is properly positioned to be sized by these rollers. In addition to facilitating the sizing operation the rotation of the uppermost sizing rollers also assists in discharging fruit from the sizer 10. It will be noted in Fig. 3 that as one of the sizing rollers designated as 76a approaches the drop board 110 it is carried out of contact with the belt 80 and as a result stops rotating while the next succeeding roller designated as 76b continues to rotate causing a piece of fruit F2 resting upon both the rollers 76a and 76b to be rolled over the sleeve 76b onto the drop board 110.

The sizer 10 may be readily adjusted to change the spacing of the sizing rollers 76 when these are at their uppermost positions by rotating the screw 53. This causes rotation of the shaft 47 thus swinging the arms 51 and 56 so as to raise or lower the cams 39. Raising the cams 39 increases the spacing between the uppermost rollers 76 while lowering the cams 39 decreases said spacing. The graduations 41 are so calibrated that the position of finger 42 thereon indicates the maximum size of fruit that will pass between the rollers 76 when the latter are disposed uppermost.

Referring to Fig. 5 I have shown therein a modified form of sizer 115 which is identical with the sizer 10 excepting that cams 116 are employed in place of the cams 60. The cams 116 are shaped to provide arcuate surfaces 117 and 118, the former being disposed closer to the axis of the rotor 12 than the latter. As the cam rollers 75 pass from the surfaces 117 to the surfaces 118 the spaces between adjacent sizing rollers 76 increase so that the fruit F1 is segregated into two sizes of which the smaller size F3 is dropped on the right side of a conveyor 120 while the larger size F4 is dropped onto the left side thereof. It is thus clear that the sizer 115 in addition to separating the fruit into large fruit F2 and small fruit F1 also divides the small fruit F1 into two groups according to size.

Although I have shown and described but one preferred and one modified form of my invention it is to be understood that other modifications and changes might be made therein without departing from the spirit and scope of the claims.

What I claim is:

1. In a sizer for rollable articles the combination of: a rotor mounted on a horizontal axis and including two rotor heads; sizing members disposed in spaced relation with each other on said rotor and parallel to said axis, said members being rotatably journalled at their opposing ends on said heads; means for rotating said rotor about said axis; means for feeding articles to be sized onto said sizing members when said members are disposed above said axis; means for receiving from said members the larger of said articles which fail to pass between said members; means for receiving the smaller of said articles which pass between said members; and means for rotating said members while the larger of said articles are resting thereon.

2. In a sizer for rollable articles the combination of: a rotor mounted on a horizontal axis and including two rotor heads; sizing members disposed in spaced relation with each other on said rotor and parallel to said axis, said members being rotatably journalled at their opposing ends on said heads; means for rotating said rotor about said axis; means for feeding articles to be sized onto said sizing members when said members are disposed above said axis; means for receiving from said members the larger of said articles which fail to pass between said members; means for receiving the smaller of said articles which pass between said members; means for rotating said members while the larger of said articles are resting thereon; and means to selectively determine the distances which separate said members during the performance of their sizing function.

3. In a sizer for rollable articles the combination of: a rotor mounted on a horizontal axis and including two rotor heads; sizing members disposed in spaced relation with each other on said rotor and parallel to said axis, said members being rotatably journalled at their opposing ends on said heads; means for rotating said rotor about said axis; means for feeding articles to be sized onto said sizing members when said members are disposed above said axis; means for receiving from said members the larger of said articles which fail to pass between said members; means for receiving the smaller of said articles which pass between said members; means for rotating said members while the larger of said articles are resting thereon; and means to adjust the spacing of said members from said axis to selectively determine the distances which separate said members during the performance of their sizing function.

4. A combination as in claim 1 in which said members rotate in a direction reverse to that of said rotor.

5. A combination as in claim 1 in which said members are cylindrical rolls and rotate in a direction reverse to that of said rotor.

6. A combination as in claim 1 in which said members are cylindrical rolls and rotate in a direction reverse to that of said rotor, the speed of points on the peripheries of said rolls relative to said rotor being considerably in excess of the absolute velocity of points on said rotor equally distant from said axis as the aforesaid points.

7. A combination as in claim 1 in which said members are cylindrical rolls and rotate in a direction reverse to that of said rotor, said rotation of each of said sizing members ceasing just prior to the discharge of said larger fruit which rests above said sizing member.

8. In a sizer for rollable articles the combination of: a rotor mounted on a horizontal axis; sizing members rotatably mounted on said rotor in spaced relation with each other and parallel with said axis; means for rotating said rotor about said axis; means for feeding articles to be sized onto said sizing members when the latter are disposed above said axis; means for rotating said members during the sizing of said articles; means for receiving from said members the larger of said articles which fail to pass between said members; means for confining the smaller of said articles which pass between said members to a space adjacent inner faces of said members until after said larger articles are discharged from said members; means causing said smaller articles to be discharged from said space; and means for receiving said smaller articles when so discharged.

9. In a sizer for rollable articles the combination of: a rotor mounted on a horizontal axis; sizing rollers disposed in spaced relationship with each other on said rotor and parallel with said axis; means for rotating said rotor about said axis; means for feeding articles to be sized onto said sizing rollers when the latter are disposed above said axis; means for rotating said rollers while the latter are sizing said articles; means for receiving from said rollers the larger of said articles which fail to pass between said rollers; means disposed within said rotor and in spaced relation with inwardly disposed faces of said rollers for confining the smaller of said articles which pass between said rollers to a space adjacent the inner faces of said rollers until the latter move below the level of said axis; means causing a spreading of said rollers as they revolve into a downward position on said rotor to permit the discharge of said smaller articles from between said rollers; and means for receiving said smaller articles when so discharged.

10. In a sizer for rollable articles the combination of: a rotor mounted on a horizontal axis; sizing rollers disposed in spaced relationship with each other on said rotor and parallel to said axis; means for rotating said rotor about said axis; means for feeding articles to be sized onto said sizing rollers when the latter are disposed above said axis; means for rotating said rollers while the latter are sizing said articles; means for receiving from said rollers the larger of said articles which fail to pass between said rollers; means disposed within said rotor and in spaced relation with inwardly disposed faces of said rollers for confining the smaller of said articles which pass between said rollers to a space adjacent the inner faces of said rollers until the latter move below the level of said axis; means for causing a graduated spreading of said rollers as the latter are revolved into downward positions on said rotor so as to permit the discharge of said smaller articles from between said rollers at different points in the travel of said rollers on said rotor so as to effect a segregation of said smaller articles into groups in accordance with their diameters; and means for receiving said smaller articles in said segregated groups when the latter are discharged from between said rollers.

11. In a sizer the combination of: a rotor mounted on a horizontal axis; sizing members disposed in spaced relation with each other on said rotor and parallel with said axis; means for rotating said rotor about said axis; means for feeding articles to be sized onto said sizing members when the latter are disposed above said axis; means for receiving from said members the larger of said articles which fail to pass between said members; means for decreasing the spaces between adjacent members as these descend in the rotation of said rotor to positions beneath the level of said axis; means for progressively increasing spaces between adjacent members as these revolve with said rotor in downward positions thereon to successively discharge the smaller of said articles from within said rotor through the spaces between adjacent members to segregate said smaller articles in accordance with their respective diameters; and means for receiving separate groups of said smaller articles into which the latter are thus segregated.

12. A combination as in claim 11 in which means is provided for confining said smaller articles to a space adjacent to the inner faces of said sizing members, between the time that said smaller articles pass downwardly between said members into the interior of said rotor and the time said smaller articles are segregated by their discharge downwardly between said members and out of said rotor.

13. In a sizer for rollable articles the combination of: a rotor mounted on a horizontal axis; a plurality of sizing members; means for mounting said sizing members on said rotor in spaced circumferential relation with each other and parallel to said axis, said members, when disposed above said axis, being all shiftable radially from said axis to vary the circumferential spacing which exists between adjacent members during the sizing operation; means for rotating said rotor about said axis; means for feeding articles to be sized onto said sizing members when said members are disposed above said axis; means for receiving from said members the larger of said articles which fail to pass between said members; and unitary settable means for effecting said radial shifting to control the aforesaid spacing.

14. In a sizer for rollable articles the combination of: a rotor mounted on a horizontal axis; a plurality of sizing members; means for rotatably mounting said sizing members on said rotor in spaced circumferential relation with each other and parallel to said axis, said members when disposed above said axis being all shiftable radially from said axis to vary the circumferential spacing which exists between adjacent members during the sizing operation; means for rotating said rotor about said axis; means for rotating said sizing members individually during the sizing operation; means for feeding articles to be sized onto said sizing members when said members are disposed above said axis; means for receiving from said members the larger of said articles which fail to pass between said members; and unitary settable means for effecting said radial shifting to control the aforesaid spacing.

15. In a sizer for rollable articles the combination of: a rotor mounted on a horizontal axis and including two rotor heads; sizing members disposed in spaced relation with each other on said rotor and parallel to said axis, said members being rotatably journalled at their opposing ends on said heads; means for rotating said rotor about said axis; means for feeding articles to be sized onto said sizing members when said members are disposed above said axis; means for receiving from said members the larger of said articles which fail to pass between said members; means for receiving the smaller of said articles which pass between said members; a pair of cams with substantially cylindrical upper surfaces and disposed at opposite ends of said rotor; means causing said members to follow said upper faces of said cams during the sizing of articles by said members; and means to adjust said cams vertically relative to said axis.

16. In a sizer for rollable articles the combination of: a rotor mounted on a horizontal axis; a plurality of sizing members; means for mounting said sizing members on said rotor in spaced circumferential relation with each other and parallel to said axis, said members, when disposed above said axis, being all shiftable radially from said axis to vary the circumferential spacing which exists between adjacent members during the sizing operation; means for rotating said rotor about said axis; means for feeding articles to be sized onto said sizing members when said members are disposed above said axis; means for receiving from said members the larger of said articles which fail to pass between said members; and unitary settable means for effecting said radial shifting to control the aforesaid spacing, said last recited means being disposed outside of said rotor and being operable for the purpose stated while said rotor is rotating.

17. In a sizer for rollable articles the combination of: a rotor mounted on a horizontal axis; a plurality of sizing members; means for mounting the said sizing members on said rotor in spaced circumferential relation with each other and parallel to said axis, certain of said members being shiftable to vary the circumferential spacing which exists between adjacent members during the sizing operation; means for feeding articles to be sized onto said sizing members when said members are disposed above said axis; means for receiving from said members the larger of said articles which fail to pass between said members; and unitary settable arcuate cam means for effecting said shifting to control the aforesaid spacing, said last recited means being disposed outside of said rotor and being operable for the purpose stated while said rotor is rotating.

HALE PAXTON.